United States Patent [19]
Slesinski et al.

[11] Patent Number: 5,395,187
[45] Date of Patent: Mar. 7, 1995

[54] METHOD AND APPARATUS FOR ATTACHING A DRILL MOTOR TO A DRILL PLATE WITH A CLAMPING DEVICE HAVING AN EXPANDABLE COLLET

[75] Inventors: Raymond J. Slesinski, Arnold; David L. Fritsche, St. Charles; Thomas O. Blankenship, St. Peters, all of Mo.

[73] Assignee: McDonnell Douglas Corporation, St. Louis, Mo.

[21] Appl. No.: 156,054

[22] Filed: Nov. 22, 1993

[51] Int. Cl.⁶ .................... B23B 35/00; B23B 45/14
[52] U.S. Cl. .................................. 408/1 R; 408/56; 408/67; 408/72 R
[58] Field of Search ............... 408/1 R, 56, 67, 72 R, 408/79, 95, 97, 110

[56] References Cited

U.S. PATENT DOCUMENTS

| | | |
|---|---|---|
| 1,946,584 | 2/1934 | Judge . |
| 2,839,953 | 6/1958 | Hanger . |
| 2,935,905 | 5/1960 | Winslow . |
| 4,286,902 | 9/1981 | Sagliano et al. ............ 408/79 |
| 4,396,318 | 8/1983 | Jensen et al. ............... 408/79 |
| 4,740,117 | 4/1988 | Deleury et al. . |
| 5,033,917 | 7/1991 | McGlasson et al. . |
| 5,161,923 | 11/1992 | Reccius . |

OTHER PUBLICATIONS

Layout, NDS Jig Collet Foot, 15 QDA-5150 & 5275, Dwg. No. 4525, Dresser Industries, Inc., Nov. 30, 1984.
Nurlock Catalog, p. 242, Telescoping Bushing Tips.

Primary Examiner—Daniel W. Howell
Attorney, Agent, or Firm—Bell, Seltzer, Park & Gibson

[57] ABSTRACT

A device for securely clamping a drill motor to a drill plate in order to drill precisely positioned holes in a workpiece includes an annular mandrel and annular collet concentrically disposed about the cutting element. A first end of the collet includes a plurality of longitudinally extending fingers while the mandrel has a tapered end portion having a larger external diameter than the center cylindrical portion of the mandrel. A pneumatically-actuated piston is also coaxially disposed about the cutting element to extend and retract the mandrel and the collet. Once extended, the longitudinally extending fingers of the collet overlie the center cylindrical portion of the mandrel. Thus, the clamping device may be inserted through an aperture defined in a drill plate. Following its retraction, the longitudinally extending fingers of the collet overlie the tapered end of the mandrel and are correspondingly expanded. The expanded fingers hook behind the periphery of the aperture defined in the drill plate and securely clamps the drill motor to the drill plate.

26 Claims, 3 Drawing Sheets

METHOD AND APPARATUS FOR ATTACHING A DRILL MOTOR TO A DRILL PLATE WITH A CLAMPING DEVICE HAVING AN EXPANDABLE COLLET

FIELD OF THE INVENTION

The present invention relates to a clamping device for securing a drill motor to a drill plate, and, more particularly, to clamping devices having an expandable collet for positive attachment to a drill plate.

BACKGROUND OF THE INVENTION

Many applications, such as automotive and aircraft fabrication, require precisely positioned holes to be drilled in a workpiece. The holes must be accurately aligned with only relatively small positioning errors tolerable. Accordingly, a drill plate is typically aligned and mounted on the workpiece prior to drilling holes through the workpiece. The drill plate has accurately positioned holes extending therethrough such that by properly aligning the drill plate with respect to the workpiece, each hole in the drill plate precisely overlies the desired location for the corresponding hole to be drilled in the workpiece.

In many instances, it is desirable to attach the drill motor to the drill plate such that the operator does not have to offset the full weight of the drill motor and the thrust generated during the drilling operation. Attachment of the drill motor to the drill plate further ensures proper alignment of the cutting element with the desired hole location in the workpiece. In many instances, the accurately positioned holes must be drilled in relatively hard materials, such as titanium. To drill holes in such materials, relatively great axial pressure must be applied to force the cutting element into and through the material. Accordingly, the affixation of the drill motor to a drill plate assists the operator in applying sufficient axial pressure to the cutting element.

Drill motors are typically attached to a drill plate by means of lock screws and a specially designed drill bushing. For example, a pair of lock screws may be positioned on opposite sides of an aperture defined in a drill plate. Lock screws typically have an unthreaded portion underlying the slotted head for receiving a corresponding flange extending outwardly from the drill bushing. Accordingly, the drill bushing may be oriented between the lock screws and rotated such that the outwardly extending flange of the drill bushing is engaged and retained beneath the slotted head of the lock screws. The bushing is thus affixed to the front surface of the drill plate.

The use of lock screws and specially designed drill bushings, however, requires the lock screws to be accurately positioned on the drill plate. In addition, the use of lock screws prevents the incorporation of immediately adjacent apertures in the drill plate since lock screws must be installed on each side of the apertures. In addition, lock screws may require periodic replacement to maintain accurate alignment with the aperture in the drill plate.

In order to securely clamp a drill motor to a drill plate without the use of lock screws, specially adapted sleeves and bushings have been designed for incorporation into the drill plate. Examples of such sleeves and bushings incorporated in drill plates include those described in U.S. Pat. No. 5,161,923 (the '923 patent) to Helmut Reccius on Nov. 10, 1992 and U.S. Pat. No. 4,740,117 (the '117 patent) to Marie-José Schaff Deleury et al. on Apr. 26, 1988. The drill plate described in the '923 patent includes a cylindrical protrusion extending outwardly from the front face of the drill plate and a recessed periphery about the aperture on the rear face of the drill plate to align and support the drill motor. The machine tool of the '923 patent includes a nosepiece having a number of longitudinal tongues. The tongues are adapted to expand within the aperture of the drill plate and be received within the recessed periphery of the aperture.

Further, the '117 patent discloses drill bushing inserts or sleeves within apertures defined in the drill plate. The inserts have a cylindrical portion extending outwardly from the front face of the drill plate about each aperture. The cylindrical portion has a flanged end for mating with the correspondingly designed drill motor. In particular, the drill motor has a plurality of protruding fingers having a flanged end portion adapted to mate with the flanged end of the cylindrical portion.

In addition, U.S. Pat. No. 2,839,953 (the '953 patent) to Randolph T. Hanger on Jun. 24, 1958 also incorporates a sleeve within the aperture defined in the drill plate. The drill bushing of the '953 patent is manually expanded within the tapered sleeve to attach the drill motor to the drill plate.

The fabrication of specially designed drill plates, however, increases the cost of the drill plates and the time required for their manufacture. The use of sleeves or bushings within the apertures of a drill plate also prevents the incorporation of overlapping apertures in the drill plate. In addition, such specially designed drill plates may generally only be used with drill motors having bushings designed to mate with the corresponding sleeves or bushings of the drill plate.

Drill bushings have also been designed for attachment to drill motors in order to clamp the drill motor to a drill plate. For example, U.S. Pat. No. 2,935,905 (the '905 patent) to J. C. Winslow on May 10, 1960 discloses a drill bushing adapted for extension through an aperture in a drill plate and for attachment thereto. The drill bushing of the '905 patent incorporates a pneumatically-actuated ram assembly for extending the drill bushing through the aperture in the drill plate. The ram assembly, however, is offset from the cutting element. Accordingly, the drill bushing of the '905 patent may not readily access all areas with limited lateral access.

Thus, while it would be desirable to have a drill bushing for securely clamping a drill motor to a drill plate in order to drill precisely aligned holes, drill bushings still suffer from a number of deficiencies, including the need for specially designed bushings or sleeves in the drill plate or the inability to reach areas of limited lateral access. In particular, it would be desirable to have a drill bushing which securely clamps a drill motor to a drill plate without requiring a bushing or sleeve to be incorporated in the drill plate and which is controlled with a pneumatically-actuated piston concentrically aligned with the cutting element.

SUMMARY OF THE INVENTION

It is therefore an object of the invention to provide an improved method and apparatus for clamping a drill motor to a drill plate.

It is another object of the invention to provide an improved method and apparatus for clamping a drill motor to a drill plate having only apertures defined therein.

It is a further object of the invention to provide an improved method and apparatus for pneumatically actuating a drill bushing for securely clamping a drill motor to a drill plate.

These and other objects are provided, according to the invention, by a clamping device including a drill bushing having longitudinally extending fingers adapted to radially expand within an aperture defined in a drill plate and to hook onto a rear face of the drill plate. An associated drill moter may thus be securely clamped to the drill plate.

The drill bushing includes an annular mandrel defining a substantially cylindrical internal bore through which the cutting element may extend, an annular collet concentrically disposed about the mandrel, means for longitudinally extending the mandrel and collet from a retracted position to an extended position such that the drill bushing may be inserted through an aperture defined in the drill plate, and means for longitudinally retracting the mandrel within the collet from the extended position to the retracted position such that the drill bushing is securely clamped to the drill plate.

The mandrel has a center cylindrical portion having a first external diameter and a tapered end portion having a second external diameter greater than the first external diameter. Further, the collet has a first end including a plurality of longitudinally extending fingers. Each finger of the collet has a first flanged end portion. When the mandrel and collet are extended and inserted through the aperture defined in the drill plate, the mandrel extends beyond the collet and the plurality of longitudinally extending fingers of the collet overlie the central cylindrical portion of the mandrel. In contrast, during retraction, the mandrel is retracted within the collet such that the longitudinally extending fingers of the collet overlie the tapered end portion of the mandrel and are correspondingly expanded. The flanged end portions of the radially expanded, longitudinally extending fingers hook behind the rear face of the drill plate through which the mandrel and collet extend. The drill motor is thus securely clamped.

The mandrel also preferably includes a cylindrical end portion adjacent to and extending beyond the tapered end portion such that the cylindrical end portion protrudes beyond the drill plate when the mandrel is in the retracted position to further support the cutting element. The drill bushing also preferably includes an annular piston housing having a longitudinal bore through which the cutting element extends. The piston housing advantageously defines an annular piston chamber therein and a port extending through the piston housing to a rear portion of the piston chamber. The piston housing of the present invention also preferably includes a rear portion having a threaded fitting adapted to mate with a corresponding connector of the drill motor.

The means for longitudinally extending the mandrel and the collet preferably includes an annular piston disposed within the piston chamber and adapted for longitudinal movement. The means for longitudinally extending the mandrel and the collet further includes means for introducing fluid, such as air, through the port defined through the piston housing such that the piston is urged forward within the piston chamber. The means for longitudinally retracting the mandrel preferably includes spring means positioned in a front portion of the piston chamber between a wall of the piston chamber and the piston such that the spring means urges the piston toward the rear portion of the piston chamber. The means for longitudinally retracting the mandrel also includes means for introducing fluid, such as air, through a port defined in the piston housing to a front portion of the piston chamber.

In operation, the combination of the drill motor and the drill bushing is aligned with an aperture defined through a drill plate. The mandrel and the collet are extended and inserted through the aperture by introducing fluid through the port defined through the piston housing which urges the piston forward within the piston chamber which, in turn, extends the mandrel and the collet. The mandrel is extended beyond the collet such that the longitudinally extending fingers of the collet overlie the central cylindrical portion of the mandrel.

Once inserted through the aperture in the drill plate, the mandrel and the collet are simultaneously retracted such that the mandrel is drawn within the collet and the longitudinally extending fingers of the collet overlie the tapered end portion of the mandrel and are correspondingly expanded. The mandrel and the collet are retracted by exhausting the fluid from the rear portion of the piston chamber and introducing fluid to the front portion of the piston chamber. The fluid is exhausted and introduced through the ports defined through the piston housing. Spring means disposed in a front portion of the piston chamber also urges the piston rearward within the piston chamber. The spring means also serves as a safety mechanism to prevent the drill bushing from suddenly loosening within the aperture if the fluid pressure is removed. The rearward movement of the piston allows the mandrel and the collet to retract due to their mechanical attachment to the piston. The flanged end portions of the expanded fingers of the collet hook behind the drill plate about the periphery of the aperture defined therethrough to securely clamp the drill motor to the drill plate.

To remove the drill motor from the drill plate, the steps are reversed. For example, the mandrel and the collet are extended by advancing the piston forward in the piston chamber. Thereafter, the drill bushing may be removed from the aperture defined in the drill plate since the longitudinally extending fingers of the collet once again overlie the central cylindrical portion of the mandrel and are, accordingly, not expanded.

The drill bushing also preferably includes an annular mandrel housing concentrically disposed about the mandrel and the collet. The mandrel housing has a rear face adjacent the piston housing and a front face which abuts the drill plate when the longitudinally extending fingers of the collet are expanded and hooked behind the drill plate. The abutment of the front face of the mandrel housing against the drill plate further secures the drill motor to the drill plate.

The annular mandrel housing defines a longitudinal bore having a first inner diameter and aperture through the front face of the mandrel housing having a second inner diameter less than the first inner diameter of the bore. A second end of the collet extends within the bore of the mandrel housing and has a radially outwardly extending flange such that the second end of the collet is retained within the bore of the mandrel housing. A collet spring is also preferably disposed within the bore of the mandrel housing. The collet spring has a first end adjacent the piston and a second end adjacent the rear flanged portion of the collet such that the collet is urged forward within the bore of the mandrel housing.

One embodiment of the drill bushing does not incorporate vacuum capabilities, but instead includes a coolant supply part defined in a rear portion of the piston housing and means for introducing coolant through the coolant supply port for delivery to the workpiece. The coolant serves to cool and lubricate the workpiece and the cutting element as well as to expel any chips generated by the drilling.

In this embodiment, the drill bushing also preferably includes an drill guide concentrically disposed within a first end of the mandrel and the collet for further supporting the cutting element. The drill guide preferably defines at least one longitudinal slot, and preferably four longitudinal slots, in its exterior surface through which coolant flows to the workpiece.

Another embodiment of the clamping device incorporates vacuum capabilities and includes a coolant supply port defined in the mandrel housing, at least one aperture defined in a sidewall of the mandrel and means for introducing coolant through the coolant supply port for delivery to the workpiece. In addition, the drill bushing of this embodiment also preferably includes a vacuum port defined in a rear portion of the piston housing and in communication with the central longitudinal bore. Further, the drill bushing also preferably comprises means for vacuuming expended coolant and chip swarf from the central longitudinal bore of the piston housing and from the surface of the workpiece. The vacuuming means is advantageously in communication with the vacuum port.

In this embodiment incorporating vacuum capabilities, the drill bushing may also include an annular drill guide concentrically disposed within the mandrel and collet for further supporting the cutting element. The drill guide of this embodiment also defines at least one aperture for permitting delivery of the coolant to the workpiece. The drill guide is preferably spring loaded, such as by a spring positioned between the drill guide and the piston, such that the drill guide is firmly pressed against the surface of the workpiece during drilling. Accordingly, sufficient vacuum may be drawn.

The method and apparatus for securely clamping a drill motor to a drill plate according to this invention allows a drill bushing to be inserted through and clamped about an aperture defined in a drill plate having no internal sleeve or bushing and no lock sleeves. Accordingly, the drill bushing of the present invention may clamp to overlapping apertures formed in the drill plate for closely positioned holes. In addition, the flush abutment of the front face of the mandrel housing with the drill plate further secures the drill motor to the drill plate. The incorporation of the annular piston within the annular piston housing coaxially disposed about the cutting element also allows the piston to efficiently extend and retract the mandrel and the collet by placing direct axial forces on the mandrel and the collet without cantilevering the drill motor or the drill bushing.

DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers referred a like element throughout.

Figures 1, 4:
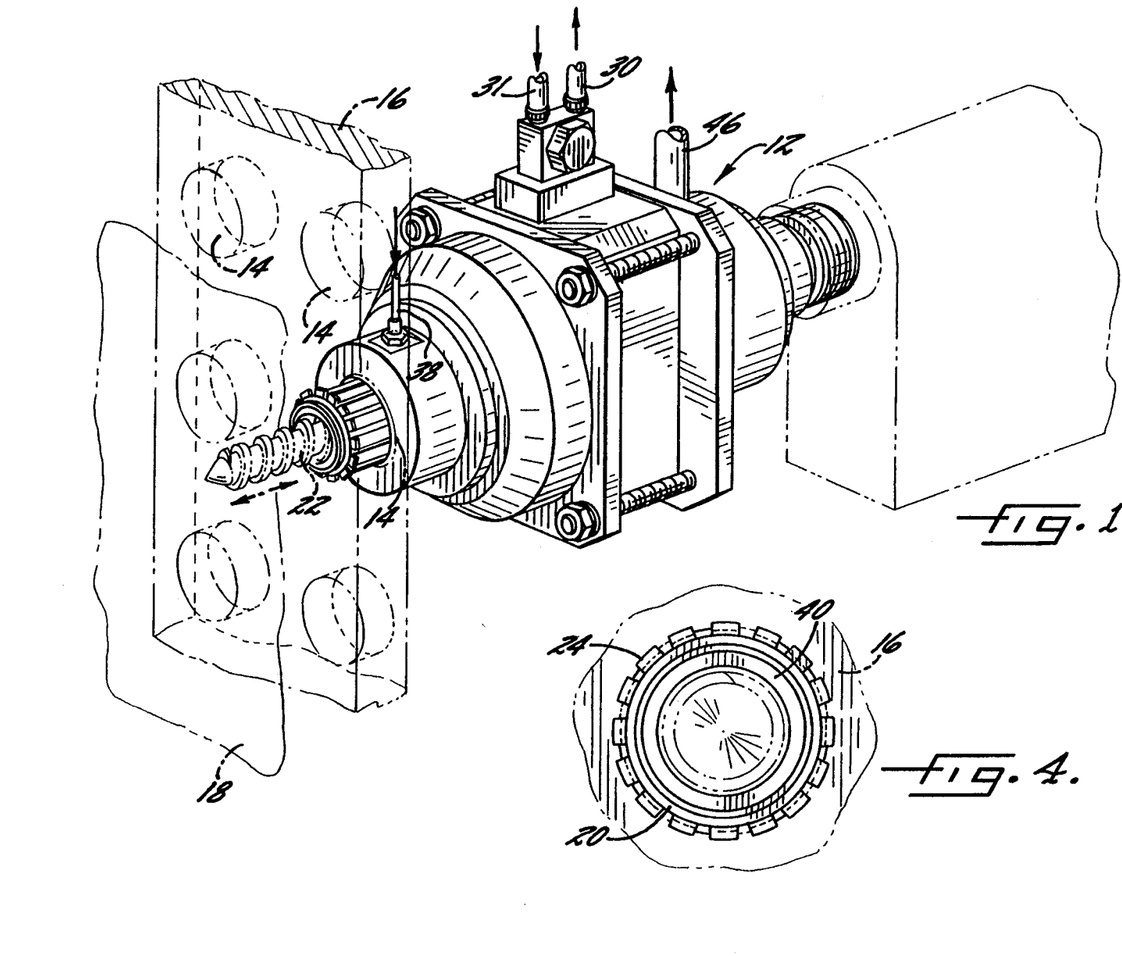
FIG. 1 is a perspective view of a drill motor and the drill bushing according to the present invention.
FIG. 4 is an end view of a drill bushing according to the present invention illustrating a drill bushing in the retracted position which is clamped to the rear face of a drill plate.

As illustrated in FIG. 1, a drill motor and drill bushing 12 according to the clamping device of the present invention are illustrated. Although any means of attaching the drill bushing 12 to the drill motor 10 known to those skilled in the art may be utilized, the rear portion of the drill bushing 12 is preferably connected to the drill motor 10 such as by complimentary threaded fittings on the drill bushing 12 and the drill motor 10.

The drill bushing 12 is adapted to be inserted through and clamped about an aperture 14 defined in a drill plate 16 so as to securely clamp the drill motor 10 to the drill plate 16. As shown in FIG. 1, the drill plate 16 is preferably spaced apart from the workpiece 18. Thus, excess coolant or chip swarf generated during the drilling operation may be expelled in the open region between the drill plate 16 an the workpiece 18. Once the drill motor 10 has been clamped to the drill plate 16, a hole may be drilled in the workpiece 18 underlying the drill plate 16. Since the drill plate 16 may be precisely aligned upon the workpiece 18, the resulting hole in the workpiece 18 is also precisely positioned.

Figure 2:
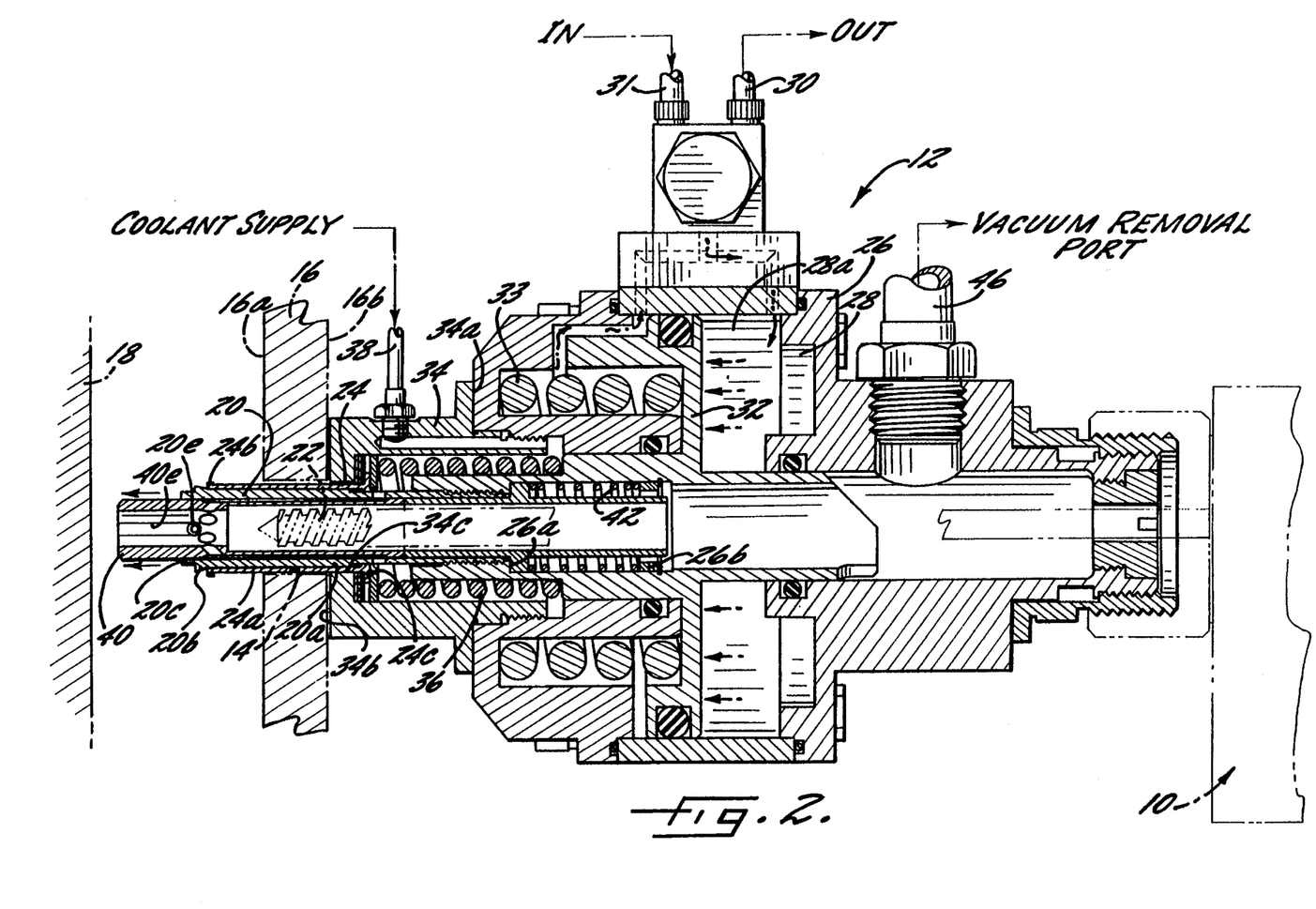
FIG. 2 is a lateral cross-sectional view of a drill bushing of the present invention and having vacuum capabilities in an extended position.
Figure 3:
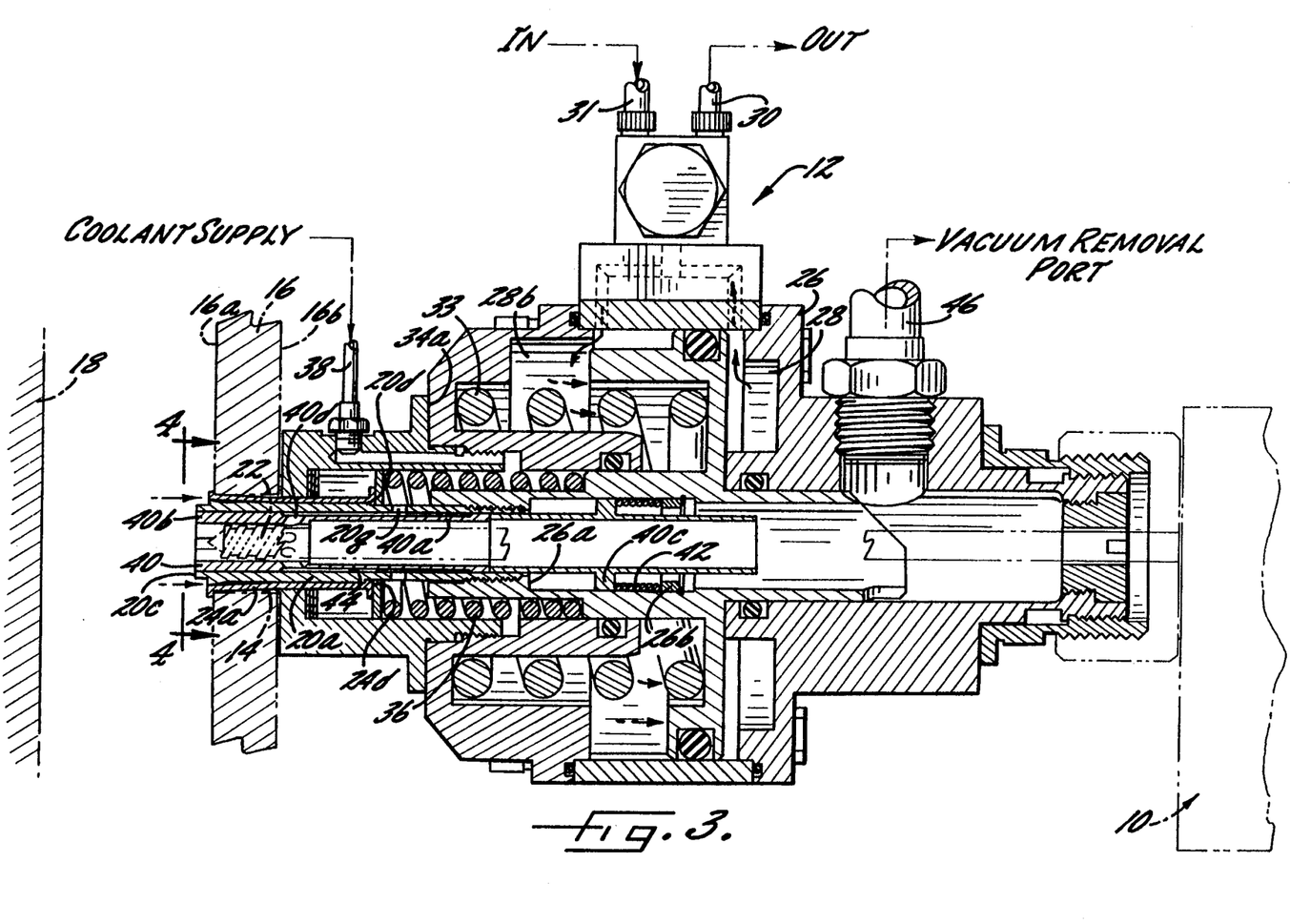
FIG. 3 is a lateral cross-sectional view of a drill bushing according to the present invention and having vacuum capabilities in a retracted position.

As shown in cross-section in FIGS. 2 and 3, the drill bushing 12 includes an annular mandrel 20 defining a substantially cylindrical internal bore through which the cutting element 22, such as a fluted drill bit, may extend. The drill bushing 12 also includes an annular collet 24 concentrically disposed about the mandrel 20 and having a first end including a plurality of longitudinally extending fingers 24a. Each longitudinally extending finger 24a of the collet 24 has a first flanged end portion 24b. The drill bushing 12 also includes means for longitudinally extending the mandrel 20 and the collet 24 from a retracted position as illustrated in FIG. 3 to an extended position as illustrated in FIG. 2. The drill bushing further includes means for longitudinally retracting the mandrel 20 within the collet 24 from the extended position to the retracted position.

The mandrel 20 has a center cylindrical portion 20a having a first external diameter and a tapered end portion 20h having an external diameter greater than the first external diameter. Preferably, the external diameter of the tapered end portion 20b gradually increases from the first external diameter to a larger diameter as shown in FIGS. 2 and 3.

The mandrel 20 also preferably includes a cylindrical end portion 20c adjacent to and extending beyond the tapered end portion 20b. The cylindrical end portion 20c is designed to extend beyond the drill plate 16 when the mandrel 20 is in the retracted position as illustrated in FIG. 3. Accordingly, the cylindrical end portion 20c of the mandrel 20 provides further support to the cutting element 22.

As illustrated in FIG. 2, the mandrel 20 extends beyond the collet 24 in the extended position such that the plurality of longitudinally extending fingers 24a of the collet 24 overlie the central cylindrical portion 20a of the mandrel 20. The plurality of longitudinally extending fingers 24a therefor extend along the surface of the central cylindrical portion 20a of the mandrel 20. Thus, the mandrel 20 and the collet 24 can be inserted through the aperture 14 defined in the drill plate since the aperture 14 has a slightly larger diameter than the unexpanded flanged end portions 24b of the collet 24.

During retraction, the mandrel 20 is retracted within the collet 24 such that the longitudinally extending fingers 24a of the collet 24 overlie the tapered end portion 20b of the mandrel 20 and are correspondingly radially expanded. The radially expanded flanged end portions 24b of the plurality of longitudinally extended fingers 24a hook behind or onto a rear face 16a of drill plate 16 through which the mandrel 20 and collet 24 extend as shown in FIG. 4. The drill motor 10 is thus securely clamped to the drill plate 16.

As best illustrated in FIG. 4, the diameter of the aperture 14 defined in the drill plate 16, while slightly larger than the unexpanded collet 24, is preferably such that the expansion of the longitudinally extending fingers 24a of the collet 24 upon the tapered end portion 20b of the mandrel 20 expand the flanged end portions 24b of the collet 24 to a diameter greater than the diameter of the aperture 14 defined in the drill plate 16. The diameter of the aperture 14 can therefore vary as desired. The minimum value of the diameter of aperture 14 is slightly greater than the unexpanded diameter of the flanged end portions 24b of the collet 24. In contrast, the maximum value of the diameter of aperture 14 is slightly less than the sum of the previously defined minimum value and twice the difference between the external diameter of the center cylindrical portion 20a of the mandrel 20 and the largest diameter of the tapered end portion 20b of the mandrel 20.

The clamping device also preferably includes an annular piston housing 26 defining a longitudinal bore through which the cutting element 22 extends. Accordingly, the piston housing 26 is disposed coaxially with the mandrel 20 and the collet 24. The piston housing 26 further defines an annular piston chamber 28 as well as ports 30 and 31 extending through the piston housing 26 to front and rear portions 28a and 28b, respectively, of the piston chamber 28.

The means for longitudinally extending the mandrel 20 and the collet 24 includes an annular piston 32 disposed within the piston chamber 28 and adapted for longitudinal movement therein. The means for longitudinally extending the mandrel 20 and the collet 24 also includes means, such as a pump, for introducing fluid, such as air, through the port 31 of the piston housing 26 such that the piston 32 is urged forward within the piston chamber 28. Further, the means for longitudinally retracting the mandrel 20 includes spring means 34 positioned in the front portion 28b of the piston chamber 28 between a front wall of the piston chamber 28 and the piston 32 such that the spring means 33 urges the piston 32 toward the rear portion 28a of the piston chamber 28. The means for longitudinally retracting the mandrel 20 also includes means for introducing fluid, such as air, through port 30 into the front portion 28b of the piston chamber 28 to retract the mandrel 20.

The drill bushing 12 also preferably includes an annular mandrel housing 34 concentrically disposed about the mandrel 20 and the collet 24. The mandrel housing 34 has a rear face 34a adjacent the piston housing 26 and a front face 34b which abuts against the front face 16b of the drill plate 16 when the longitudinally extending fingers 24a of the collet 24 hook behind the drill plate 16 and securely clamp the drill motor 10 to the drill plate 16. The annular mandrel housing 34 also defines a longitudinal bore having a first inner diameter through which the collet 24 and the mandrel 20 extend. Further, the mandrel housing 34 defines an aperture 340 through the front face 34b of the mandrel housing 34 having a second inner diameter less than the first inner diameter of the bore. This second inner diameter is approximately equal to the outer diameter of the collet 24 such that the concentrically disposed mandrel 20 and collet 24 are limited to axial movement.

The second end of the collet 24 extends within the bore of the mandrel housing 34 and has a radially outwardly extending flange 24c such that the second end of the collet 24 is retained within the bore of the mandrel housing 34. The collet 24 may, however, move axially within the bore of the mandrel housing 34. A collet spring 36 is also preferably disposed within the bore of the mandrel housing 34. The collet spring 36 has a first end adjacent the piston 32 and a second end adjacent the rear flanged portion 24c of the collet 24. Accordingly, the collet spring 36 urges the collet 24 forward within the bore of the mandrel housing 34.

The forward movement of the annular piston 32 due to the introduction of fluid in the rear portion 28a of the piston chamber 28 extends the mandrel 20 and the collet 24 forward for insertion through an aperture 14 in a drill plate 16. Likewise, the rearward movement of the piston 32 retracts the mandrel 20 and the collet 24 which, in turn, expands the longitudinally extending fingers 24a of the collet 24 for clamping the drill motor be to the drill plate 16 To move the piston 32 rearwardly, the fluid in the rear portion 28a of the piston chamber 28 is exhausted through port 31 and fluid is introduced into the front portion 28b of the piston chamber 28 through port 30. The spring means 33 also urges the piston 32 rearwardly. The spring means 33 also serves a safety mechanism by preventing rapid loosening of the drill bushing 12 within the aperture 14 if the fluid pressure is suddenly lost or diminished.

The coordinated movement of the piston 32, mandrel 20 and collet 24 is due to the connection of the mandrel 20 to the piston 32 such that the movement of the mandrel 20 tracks the movement of the piston 32, The forward movement of the piston 32 is also transferred to collet 24 through the collet spring. The forward movement of the collet 24 is restricted such that the collet 24 does not advance as far as the mandrel 20. The collet 24 is restricted by its contact with the front face 34b of the mandrel housing 34 which prevents further extension of the collet 24 as illustrated in FIG. 2. When the piston 32 is fully extended, the collet spring 36 is slightly compressed due to the axial restriction imposed by the mandrel housing 34.

The collet 24 is retracted upon rearward movement of the piston 32 due to the cooperation of a shoulder 20d formed on the outer surface of the center cylindrical portion 20b of the mandrel 20 which engages a radially inwardly extending flange 24d on the second end of the collet 24. Accordingly, the retraction of the mandrel 20 also retracts the collet 24.

A first embodiment of a clamping device according to the present invention which incorporates vacuum capabilities is illustrated in FIGS. 2 and 3. In this embodiment, the drill bushing 12 preferably includes an annular drill guide 40 concentrically disposed within the mandrel 20 and the collet 24 for further supporting the cutting element 22. The drill guide 40 has a substantially cylindrical shaft portion 40a and a first end portion 40b. A flange 40c extends outwardly from a center portion of the cylindrical shaft portion 40a of the drill guide 40. In addition, the substantially cylindrical bore defined by the piston housing 26 preferably includes a shoulder 26a for cooperating with the outwardly extending flange 40c, retaining the drill guide 40 within the drill bushing and preventing excessive axial extension of the drill guide 40.

In this embodiment, the drill guide 40 is also preferably spring loaded such that, absent external axial compressive forces, the drill guide will be fully extended such that the outwardly extending flange 40c contacts the shoulder 26a of the internal bore of the piston housing 26. Accordingly, a drill guide spring 42 is preferably positioned within the bore defined through the piston housing 26. More particularly, the drill guide spring 42 is positioned rearwardly of the outwardly extending flange 40c and contacts, at a first end, a rear surface of the outwardly extending flange 40c and, at a second end, a flange 26b extending inwardly from the piston housing 26 into the internal bore.

As illustrated in FIGS. 2 and 3, the drill guide spring 42 extends the drill guide 40 for contact with the workpiece 18 upon insertion of the drill bushing 12 through the aperture 14 in the drill plate 16. The drill guide spring 42 is thereafter compressed as the drill bushing 12 is further inserted through the aperture 14. However, contact is preferably maintained between the drill guide 40 and the surface of the workpiece 18 during retraction of the mandrel 20 and the collet 24.

In the embodiment illustrated in FIGS. 2 and 3, the mandrel housing 34 preferably further defines a coolant supply port 38, at least one aperture 20g is defined in the sidewall of the mandrel 20 and at least one aperture 40d is defined in the drill guide 40. The drill bushing 12 also includes means for introducing coolant through the coolant supply port 38.

The first end portion 40b of the drill guide 40 preferably has an exterior diameter which is approximately equal to the interior diameter of the mandrel 20 and slightly greater than the exterior diameter of the cylindrical stem portion 40a of the drill guide 40. Accordingly, an annular slot 44 is defined between the cylindrical stem portion 40a of the drill guide 40 and the mandrel 20. Thus, coolant, which is introduced through the coolant supply port 38, flows through a rear portion of the longitudinal bore of the mandrel housing 34, the aperture 20g defined in the mandrel 20, the annular slot 44 and the aperture 40d defined in the drill guide 40 for ultimate delivery to the workpiece 18.

As further illustrated in FIGS. 2–4, the piston housing 26 of this embodiment also preferably defines a vacuum port 46 through a rear portion of the piston housing 26 to the central longitudinal bore. The drill bushing 12 further includes means for vacuuming in communication with the vacuum port 46 for removing expended coolant and chip swarf from the central longitudinal bore of the piston housing 26 and from the surface of the workpiece 18. The vacuum means typically includes a air hose connected at the first end to the vacuum port 46 and at a second end to a pump (not illustrated). Accordingly, the pump is adapted to draw a vacuum through vacuum port 46. For a fluted cutting element 22, the expended coolant and the chip swarf are drawn upward through the flutes by the vacuuming means and exhausted through the vacuum port 46 defined in the piston housing 26. In order to further establish a vaccum, the drill guide 40 and the surface of the workpiece 18 are preferably in contact as to allow a vacuum to be drawn through the central longitudinal bore of the piston housing 26.

The mandrel 20 preferably includes an inwardly projecting rod 20e which is received by a corresponding longitudinal alignment slot 40e in the external surface of the drill guide 40. The combination of the inwardly extending rod 20e and the longitudinal alignment slot 40e of the drill guide 40 prevents the drill guide 40 from rotating within the mandrel 20 upon rotation of the cutting element 22.

The clamping device of the present invention need not incorporate vacuum capabilities. In a second embodiment of the clamping device which does not incorporate vacuum capabilities, the piston housing 26 defines a coolant supply port 38 and the drill bushing 12 includes means for introducing coolant through the coolant supply port 38 for delivery to the workpiece 18. The coolant serves to lubricate and cool the surface of the workpiece 18. Further, the excess coolant may flush chip swarf from the hole during machining. Since the mandrel 20 and the collet 24 do not contact the workpiece 18 while the drill bushing 12 is securely clamped to the drill plate 16, the excess coolant and chip swarf may readily be removed.

A clamping device according to this embodiment also preferably includes a drill guide 40. The drill guide 40 is generally cylindrical and is press fit in a first end of the mandrel 20 so as to be aligned coaxially with the mandrel 20 and the collet 24. To facilitate the press fit engagement of the drill guide 40 with the mandrel 20, the internal bore of the mandrel 20 preferably has an inwardly projecting shoulder defined therein (not illustrated) against which the drill guide 40 abuts. In addition, the external surface of the drill guide 40 also defines a pluraltiy of apertures 40d. Thus, coolant, which has been introduced through the coolant supply port 38 may flow through the apertures 40d to the flutes of the cutting element 22 for delivery to the workpiece 18.

In the drawings and specification, there have been disclosed typical preferred embodiments of the invention and, although specific terms are employed, the terms are used in a generic and descriptive sense only not for purposes of limitation, the scope of the invention being set forth in the following claims.

That which is claimed:

1. A device for clamping a drill motor to a drill plate and for receiving a cutting element, said clamping device comprising:
   an annular mandrel defining a cylindrical internal bore through which the cutting element may extend, said mandrel having a center cylindrical portion having a first external diameter and a tapered end portion having a second external diameter greater than the first external diameter;

an annular collet concentrically disposed about said mandrel and having a first end including a plurality of longitudinally extending fingers;

means, including an annular piston, for longitudinally extending said mandrel and collet from a retracted position to an extended position such that said mandrel extends beyond said collet and the plurality of longitudinally extending fingers of said collet overlie the central cylindrical portion of said mandrel, and wherein said annular piston defines a bore having a longitudinal axis extending coaxial with the longitudinal axes of said mandrel and said collet; and means for longitudinally retracting said mandrel within said collet from the extended position to the retracted position such that the longitudinally extending fingers of said collet overlie the tapered end portion of said mandrel and correspondingly expand radially, whereby the plurality of longitudinally extending fingers hook behind the drill plate through which said mandrel and collet extend.

2. A clamping device according to claim 1 further comprising an annular piston housing defining a longitudinal bore through which the cutting element extends, said piston housing further defining an annular piston chamber therein and a port extending through said piston housing to a rear portion of the piston chamber.

3. A clamping device according to claim 2 wherein said annular piston is disposed within said piston chamber and is adapted for longitudinal movement therein.

4. A clamping device according to claim 3 wherein said means for longitudinally extending said mandrel and collet further includes means for introducing fluid through the port of said piston housing such that said piston is urged forward within said piston chamber.

5. A clamping device according to claim 3 wherein said means for longitudinally retracting said mandrel includes spring means positioned between a front portion of the piston chamber and said piston such that said spring means urges said piston toward the rear portion of the piston chamber.

6. A clamping device according to claim 3 further comprising:

an annular mandrel housing concentrically disposed about said mandrel and collet, said mandrel housing having a front face and a rear face adjacent said piston housing; and means for abutting the front face of said mandrel housing and the drill plate when the longitudinally extending fingers of said collet hook behind the drill plate to securely clamp the drill motor thereto.

7. A clamping device according to claim 6 wherein said annular mandrel housing defines a longitudinal bore having a first inner diameter and an aperture through the front face of said mandrel housing having a second inner diameter less than the first inner diameter, and wherein a rear portion of said collet extends within the bore of said mandrel housing, the rear portion of said collet having a radially outwardly extending flange such that the rear portion of said collet is retained within the bore of said mandrel housing.

8. A clamping device according to claim 7 further comprising a collet spring disposed within the bore of the mandrel housing and having a first end adjacent said piston and a second end adjacent the rear flanged portion of said collet such that said collet is urged forward.

9. A clamping device according to claim 7 further comprising:

an annular drill guide concentrically disposed within said mandrel and collet for supporting the cutting element;

means for extending said drill guide upon forward movement of said piston; and means for retracting said drill guide upon rearward movement of said piston.

10. A clamping device according to claim 9 wherein said mandrel housing further defines a coolant supply port and at least one aperture is defined through both a first end of said drill guide and said mandrel, and wherein said clamping device further comprises means for introducing coolant through said coolant supply port and through the at least one aperture defined through both said drill guide and said mandrel for delivery to the workpiece.

11. A clamping device according to claim 10 wherein said piston housing further defines a vacuum port through said piston housing to the central longitudinal bore, and wherein said clamping device further comprises means for vacuuming expended coolant and chip swarf from the central longitudinal bore of said piston housing.

12. A clamping device according to claim 10 wherein said piston housing further defines a coolant supply port in communication with the central longitudinal bore and said drill guide includes at least one longitudinal slot in an exterior surface, and wherein said clamping device further comprises means for introducing coolant through said coolant supply port and through the at least one longitudinal slot of said drill guide for delivery to the workpiece.

13. A clamping device according to claim 1 wherein said mandrel further comprises a cylindrical end portion adjacent to and extending beyond the tapered end portion such that the cylindrical end portion protrudes beyond the drill plate when said mandrel is in the retracted position to further support the cutting element.

14. A clamping device according to claim 2 wherein said piston housing further comprises a rear portion having a threaded fitting adapted to mate with a corresponding connector of the drill motor.

15. A combination of a drill motor and a device for clamping the drill motor to a drill plate and for receiving a cutting element, the clamping device comprising:

an annular mandrel defining a substantially cylindrical internal bore through which the cutting element may extend, said mandrel having a center cylindrical portion having a first external diameter and a tapered end portion having an external diameter greater than the first external diameter;

an annular collet concentrically disposed about said mandrel and having a first end including a plurality of longitudinally extending fingers, wherein each finger has a first flanged end portion;

an annular piston for longitudinally extending said mandrel and collet from a retracted position to an extended position such that said mandrel extends beyond said collet and the plurality of longitudinally extending fingers of said collet overlie the central cylindrical portion of said mandrel, and wherein said annular piston defines a bore having a longitudinal axis extending coaxial with the longitudinal axes of said mandrel and said collet; and means for longitudinally retracting said mandrel within said collet from the extended position to the retracted position such that the longitudinally extending fingers of said collet overlie the tapered end portion of said mandrel and correspondingly expand radially, whereby the flanged end portions of the plurality of longitudinally extending fingers hook behind the drill plate through which said mandrel and collet extend.

16. A method for clamping a drill motor to a drill plate with a clamping device having a mandrel and a collet, concentrically disposed about the mandrel and having a plurality of longitudinally extending fingers, adapted for longitudinal movement in response to longitudinal movement of an annular piston, wherein the annular piston, mandrel and collet are disposed coaxially and define a substantially cylindrical longitudinal bore for receiving a cutting element, the method comprising the steps of:

urging the annular piston of the clamping device forward such that the piston forces the mandrel and collet longitudinally forward such that the mandrel and collet may be extended through an aperture in the drill plate; and hooking the plurality of extended, longitudinally extending fingers onto a rear face of the drill plate.

17. A method for clamping a drill motor to a drill plate according to claim 16 wherein the step of hooking the plurality of longitudinally extending fingers includes the step of radially expanding the plurality of longitudinally extending fingers.

18. A method for clamping a drill motor to a drill plate according to claim 17 wherein the step of urging the annular piston forward includes the steps of:

extending the annular mandrel through an aperture defined in the drill plate to an extended position, the mandrel having a center cylindrical portion with a first external diameter and a tapered end portion with a second external diameter greater than the first external diameter; and extending the annular collet through the aperture defined in the drill plate to an extended position, such that the longitudinally extending fingers overlie the center cylindrical portion of the mandrel.

19. A method for clamping a drill motor to a drill plate according to claim 18 wherein the step of radially expanding the plurality of longitudinally extending fingers includes the step of simultaneously retracting the mandrel and the collet from the extended position to a retracted position such that the tapered end portion of the mandrel is drawn within the first end of the collet such that the plurality longitudinally extending fingers of the collet overlie the tapered end portion of the mandrel and are correspondingly expanded, whereby the plurality of longitudinally extending fingers hook behind the drill plate through which the mandrel and collet extend.

20. A method for clamping a drill motor to a drill plate according to claim 19 wherein said step of simultaneously retracting the mandrel and the collet includes the step of urging the piston rearward such that the mandrel and the collet are urged rearward, wherein the amount by which the mandrel is retracted is greater than the amount by which the collet is retracted.

21. A method for clamping a drill motor to a drill plate according to claim 20 wherein the annular piston is concentrically disposed within an annular piston housing and wherein said step of urging the piston forward includes the step of introducing fluid through a port defined through a rear portion of the piston housing such that the piston is forced forward within the piston housing.

22. A method for clamping a drill motor to a drill plate according to claim 21 wherein said step of urging the piston rearward includes the steps of:

exhausting a portion of the introduced fluid from the rear portion of the piston housing;

introducing fluid into a front portion of the piston housing; and forcing the piston rearward with a spring disposed within a front portion of the piston housing while the rear portion of the piston housing is exhausted.

23. A method for clamping a drill motor to a drill plate according to claim 16 further comprising the step of guiding and supporting the cutting element with a drill guide concentrically disposed within the mandrel and the collet.

24. A method for clamping a drill motor to a drill plate according to claim 18 further comprising the step of introducing coolant within the longitudinal bore defined in the mandrel for delivery to the workpiece such that the cutting element is lubricated and heating of the cutting element and the workpiece is reduced.

25. A method for clamping a drill motor to a drill plate according to claim 24 further comprising the step of vacuuming excess coolant and chip swarf from both the longitudinal bore defined in the mandrel and from the workpiece.

26. A method for clamping a drill motor to a drill plate according to claim 19 further comprising the steps of advancing the cutting element and drilling a hole in a workpiece following said step of simultaneously retracting the mandrel and collet.

* * * * *